United States Patent [19]
Nelsen et al.

[11] 3,791,115
[45] Feb. 12, 1974

[54] TRACTOR-MOUNTED MOWER

[75] Inventors: Arlyn Ray Nelsen; Wilfred LeeRoy Steuerwald, both of Ottumwa, Iowa

[73] Assignee: Deere & Company, Moline, Ill.

[22] Filed: July 6, 1972

[21] Appl. No.: 269,344

[52] U.S. Cl............ 56/15.2, 56/10.4, 56/16.2, 56/282
[51] Int. Cl............................................ A01d 55/28
[58] Field of Search. 56/254, 10.2, 10.4, 10.9, 14.9, 56/15.1, 15.2, 16.2, 271, 276–288

[56] References Cited
UNITED STATES PATENTS

| | | | |
|---|---|---|---|
| 2,917,889 | 12/1959 | Vatz | 56/10.4 |
| 2,580,266 | 12/1951 | Abgarian | 56/10.4 |
| 2,637,966 | 5/1953 | Richey | 56/10.4 |
| 2,673,437 | 3/1954 | Pollock et al. | 56/11.9 |
| 2,779,145 | 1/1957 | Smith | 56/10.4 |
| 2,932,931 | 4/1960 | Elfes | 56/10.4 |
| 3,014,328 | 12/1961 | Scarnato et al. | 56/15.3 |
| 3,151,430 | 10/1964 | Wathen et al. | 56/15.2 |
| 3,234,718 | 2/1966 | Wathen | 56/10.9 |

*Primary Examiner—Russell R. Kinsey*

[57] ABSTRACT

A three-point hitch-mounted mower has a main frame that is mounted on and vertically adjustable with the tractor hitch. A generally fore-and-aft subframe is swingably mounted on the main frame on a transverse pivot, and the forward end of the subframe is connected to the tractor drawbar so that the rearward end of the subframe raises at a more rapid rate than the main frame. A transversely extending drag bar is universally pivoted to the main frame and carries a yoke at its outer end, a mower driving head being pivotally connected to the yoke for swinging about a fore-and-aft axis. A transversely extending cutter bar extends outwardly from the driving head and is driven thereby, and the driving head is connected to the rearward end of the subframe by a chain which causes the driving head to rock and thereby raise the cutter bar as the subframe raises, the chain having a predetermined amount of slack when the cutter bar is in operating position to allow the outer end of the cutter bar to float downwardly. A tension spring also extends between the rearward end of the subframe and the driving head offset from the driving head pivot, so that the spring partly counterbalances the weight supported on the mower shoes at the inner and outer ends of the cutter bar, a chain being mounted in parallel with the spring to limit the spring extension and raise the inner end of the cutter bar after the main frame and subframe raise a predetermined amount.

28 Claims, 9 Drawing Figures

TRACTOR-MOUNTED MOWER

BACKGROUND OF THE INVENTION

This invention relates to a reciprocating cutter bar type mower and more particularly to a mechanism for mounting the mower on a tractor.

It is well known to mount a mower on the three-point hitch system of a tractor by means of a mechanism which supports the mower cutter bar laterally of the tractor with the inner end of the cutter bar outside the tractor wheels. It is also known to provide a mounting system which raises and lowers the cutter bar with the vertical adjustment of the three-point hitch system.

While earlier mowers of said type generally used a Pitman drive powered from the tractor power take-off shaft, many of the mounted mowers have utilized a wobble-type driving head mounted at the inner end of the cutter bar, the driving head being conventionally driven by a power shaft from the power take-off and a belt drive having a driven sheave connected to the driving head. In such mowers, it is known to mount the driving head on a generally fore-and-aft pivot so that the cutter bar and driving head are swingable about the pivot adjacent the inner end of the cutter bar, the pivot being provided in a yoke mounted on the outer end of a drag bar, the inner end of which is pivotally connected to a main frame carried by the three-point hitch. It is further known to provide a mechanism for initially swinging the driving head to raise the outer end of the cutter bar as the main mower frame is raised and thereafter to raise both the inner and outer ends of the cutter bar as the main frame is raised.

In such mowers, it has also been conventional to provide spring means for counterbalancing the weight supported on the inner and outer shoes on the cutter bar. Also, the cutter bars are conventionally manually swingable upwardly and over center from their raised position to a folded or transport position, it being also known to provide a locking device for locking the cutter bar in the transport position. It is also known to permit the drag bar to swing about a vertical pivot so that the cutter bar swings rearwardly to a folded back position when it strikes an obstruction to prevent damage to the cutter bar, a tow bar being conventionally provided between the drag bar and the tractor frame, which separates to permit the drag bar to swing rearward when a predetermined amount of tensile stress beyond the normal tensile stress in the tow bar is experienced.

SUMMARY OF THE INVENTION

According to the present invention, there is provided an improved mower design, that is of simple and rugged construction, having improved operation and dependability. More specifically, there is provided an improved mechanism for mounting a mower on a tractor. Still more specifically, there is provided an improved mechanism for mounting a mower on a three-point hitch system of the tractor and for controlling the position of the mower through the three-point hitch system.

An important feature of the invention resides in the fact that the mower is easily attachable to tractors having Category I or Category II three-point hitches without utilizing special tools. Also, the mower frame has provisions for easily converting the mower from wide tread to narrow thread positions without additional parts. More specifically, the mower is converted from one position to the other by shifting the mounting location of the drag bar on the main mower frame and reversing parts in the lift mechanism.

Another feature of the invention resides in the provision of a subframe which rocks relative to the main mower frame as the main frame raises to exaggerate the movement of the three-point hitch, the exaggerated movement of the subframe being transmitted to the driving head for the cutter bar to raise the cutter bar as the three-point hitch raises. Also, sufficient slack is provided in the connection between the subframe and the driving head to allow the outer end of the cutter bar to float downwardly for cutting on down slopes, the cutter bar raising only after a predetermined amount of vertical adjustment of the hitch with the outer end of the cutter bar raising first.

Another feature of the invention resides in the provision of a linkage between the main frame and the tractor drawbar to limit the downward movement of the main frame, thereby establishing the lowered operating position of the main frame.

Still another feature of the invention resides in the provision of a single spring which counterbalances part of the weight of both the inner and outer ends of the cutter bar. More specifically, the counterbalance spring is attached to the driving head for the cutter bar offset from the pivot about which the cutter bar and driving head rotate, so that the spring creates a moment opposite from the moment created by the weight on the outer cutter bar shoe, while the vertical component of the spring force counterbalances the weight on the inner shoe. Also, alternate connecting points for the spring are provided on the driving head to vary the lever arm through which the spring acts, so that the mechanism can be adjusted for different cutter bars.

Another feature of the invention resides in an improved device for locking the cutter bar in a folded over or transport position, said locking being accomplished by locking a link in the lift mechanism to the supporting structure for the driving head, thereby locking the driving head to the support structure.

Another feature of the invention resides in the provision of improved means for adjusting the cutter bar tilt, said tilted adjustment being accomplished by adjusting the annular position of the yoke, which pivotally supports the driving head, on the outer end of the drag bar.

Still another feature of the invention resides in the provision of an improved breakaway system in the mounting mechanism, whereby the cutter bar will break rearwardly about a vertical pivot between the main mower frame and the transversely extending structure which supports the driving head and cutter bar. Also, the driving head is driven by a belt drive, which is so located relative to the breakaway pivot that the belt drive automatically disengages when the cutter bar breaks away. Also, the cutter bar is maintained in its laterally extending operating position by a pull bar, which is under tension when the mower is operating and is provided with a release mechanism which permits the pull bar to separate when the tensional stress exceeds a predetermined value, allowing the mower to break away. Another feature of the invention resides in the fact that the pull bar is connectible to the yoke in the driving head supporting structure at alternate locations for wide and narrow positions of the cutter bar, so that a single pull bar can be utilized in either position.

DESCRIPTION OF THE PREFERRED EMBODIMENT

The invention is embodied in a mower which is attachable to a tractor 10, only the rearward portion of which is shown in the drawings. The tractor is of conventional construction and includes a pair of rear axle housings 12 from which rear axles 13 project, a pair of rear drive wheels 14 being mounted on the opposite axles 13. As is well known, the wheels 14 are adjustable on the axles 13 to vary the tread width of the tractor.

As is also conventional, the tractor includes a rearward three-point hitch 16 including a pair of rearwardly extending, vertically swingable lower links 17, the vertical positions of which are controlled by a pair of lift arms 18, and a vertically swingable central upper link 19. A conventional laterally swingable drawbar 20 extends rearwardly from the tractor between the lower links, and a PTO output shaft 22 also extends rearwardly from the tractor immediately above the drawbar, the PTO shaft being on the centerline of the tractor centrally between the lower links 17.

The mower has a main frame, indicated generally by the numeral 24, mounted on the tractor three-point hitch 16 for vertical adjustment therewith. The main frame includes an inverted U-shaped member 26 having generally upright right and left legs 27 and 28 respectively connected by an upper transverse portion 29, the upper part of the legs 27 and 28 being inclined somewhat upwardly and forwardly. A transverse beam 30 interconnects the lower ends of the legs 27 and 28. A pair of generally upright fore-and-aft C-shaped members 31 and 32 respectively have their ends connected to and extend forwardly from the right and left legs 27 and 28, and a second transverse beam 33 forwardly of the beam 30 interconnects the lower parts of the C-shaped members 31 and 32. As is apparent, the upper link 19 is pivotally connected to the transverse portion 29 of the main frame, while the opposite lower links 17 are respectively pivotally connected to the opposite C-shaped members 31 and 32 by means of transverse pivots, so that the main frame 24 raises and lowers with the three-point hitch. Bushings are provided on the transverse pivots if the mower is mounted on a Category II three-point hitch rather than a Category I hitch, and alternate attaching holes are pivoted for the top link 19 for the alternate hitches.

Figure 3:
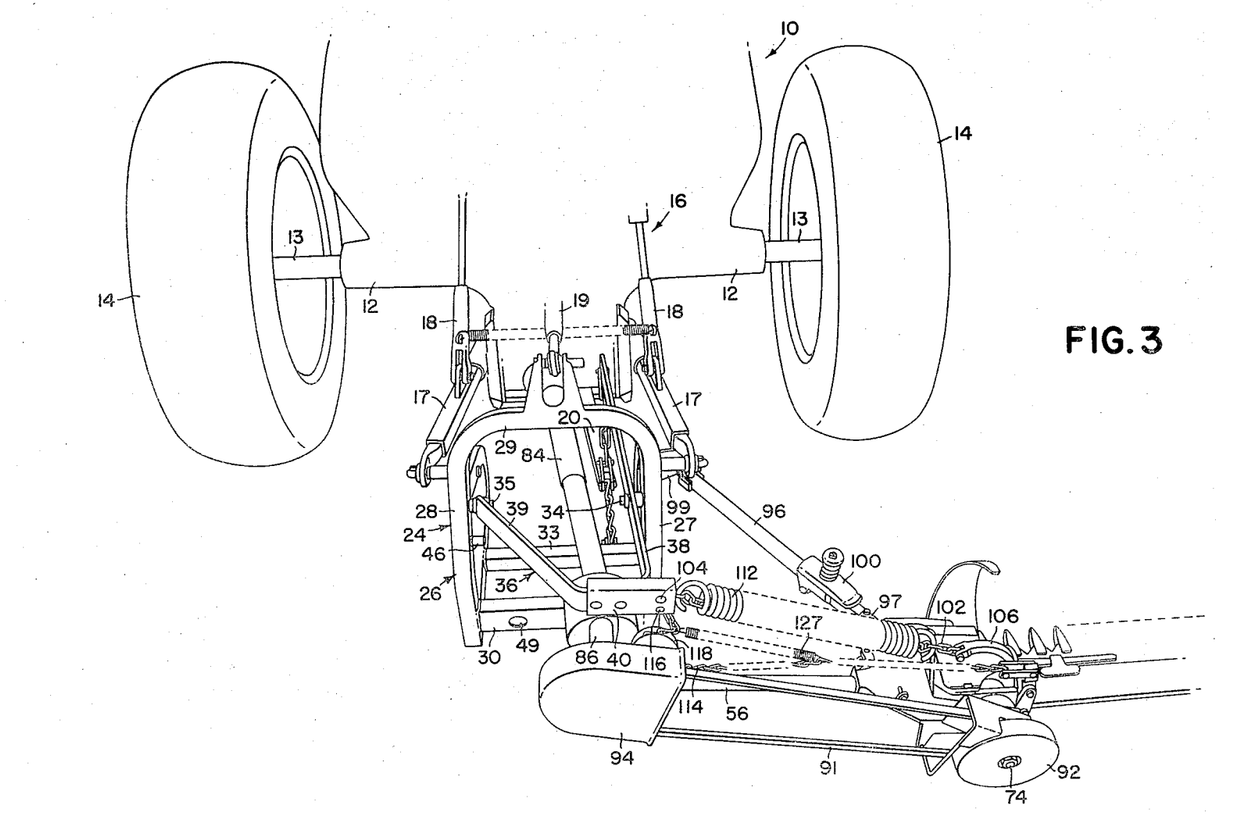
FIG. 3 is a top rear perspective view of the mower in operating position with the right end of the mower cutter bar omitted and showing the mower positioned for use with a wide tread tractor.
Figure 4:
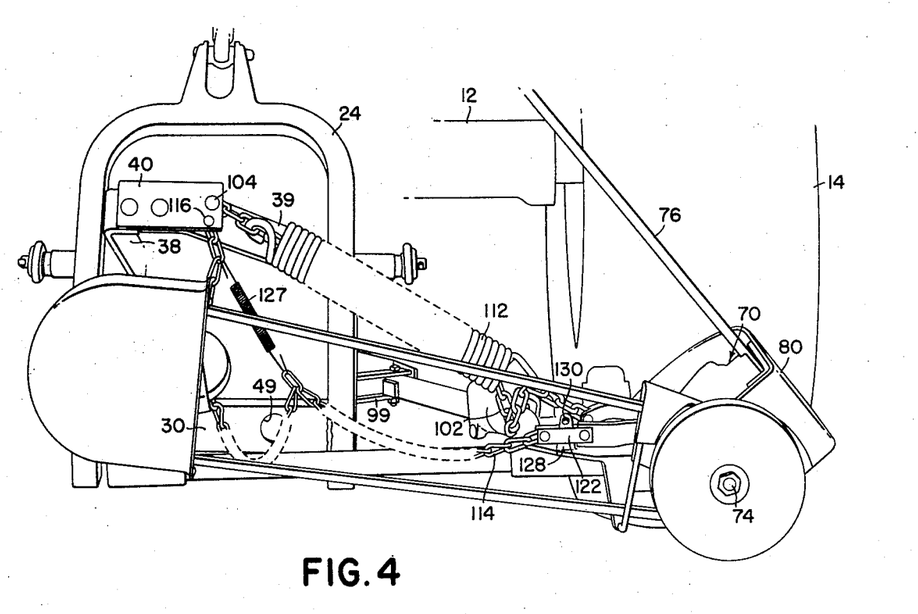
FIG. 4 is a rear perspective view of the mower in transport position with the mounting mechanism positioned for a narrow tread tractor.

A pair of aligned transverse pivots 34 and 35 are respectively mounted on the legs 27 and 28 of the main frame and extend inwardly therefrom, and a subframe 36 is swingably mounted on the pivots 34 and 35. The subframe is disposed in a generally horizontal, fore-and-aft position when the main frame is in its lower operating position and includes a generally fore-and-aft arm 38 swingably mounted intermediate its ends on one of the pivots, a shorter arm 39 having its forward end mounted on the other pivot, and a transverse portion 40 bolted to the rearward ends of the arms 38 and 39. The shorter arm 39 is angled inwardly, and the arms are reversible, so that when the long arm 38 is mounted on the right pivot 34, as illustrated in FIG. 3, the transverse portion 40 is connected to the arms on the right side of the tractor centerline, while, when the longer arm 38 is mounted on the left pivot 35, as illustrated in FIG. 4, the transverse portion 40 is connected to the arms on the left side of the tractor centerline.

A chain 42 has one end connected to the forward end of the longer subframe arm 38 and its opposite ends connected to one of two alternate ears 43 extending forwardly from the main frame beam 33 on opposite sides of the centerline. The chain includes an attachment link 44 intermediate its opposite ends, which is connected to the tractor drawbar by a fastener 45. When the arm 38 is disposed on the right side of the subframe, as shown in FIG. 3, the drawbar is swung to the right and the chain is attached to the right-hand ear 43, while the drawbar is swung to the left and the chain is attached to the left-hand ear 43 when the subframe is reversed.

Figure 8:
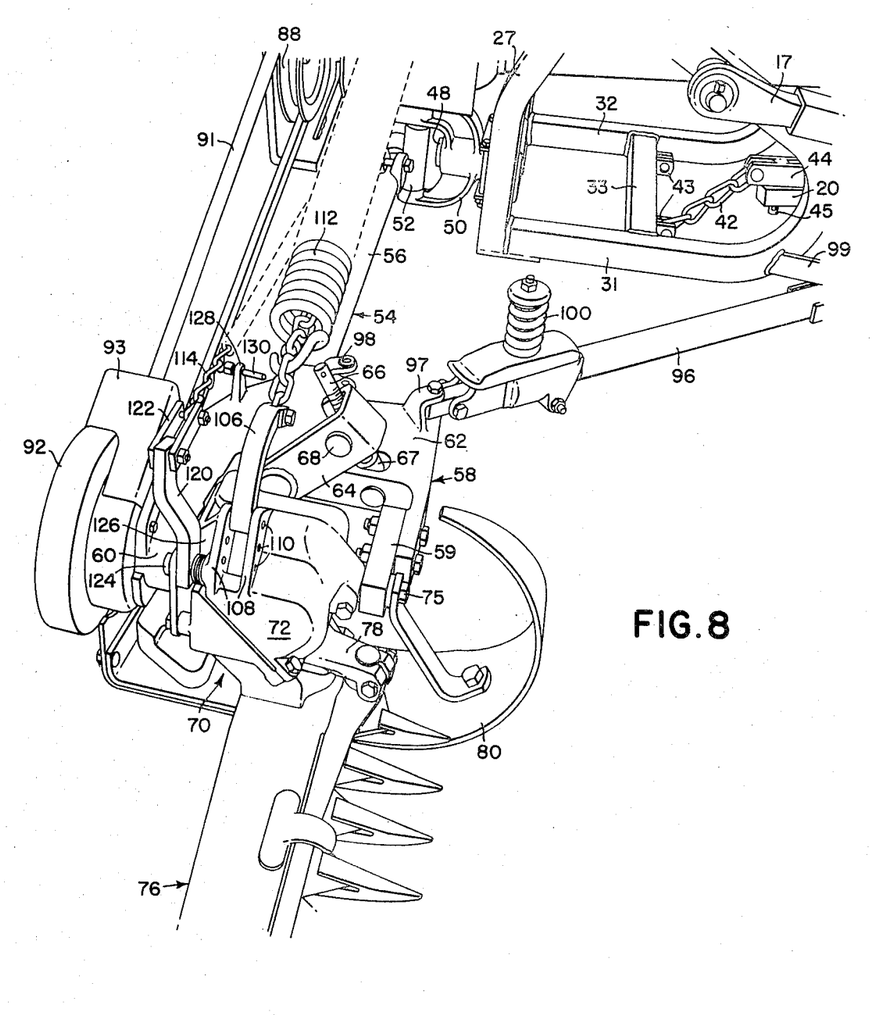
FIG. 8 is an enlarged right side and top perspective view of the mower driving head and a portion of the mounting mechanism.

The lower section of the chain 42 between the drawbar and the main frame functions as a stop, which limits the downward movement of the mower main frame 24. As best seen in FIG. 8, the lower section of the chain is under tension and extends downwardly and rearwardly from the drawbar when the main frame is in operating position. Since the main frame moves upwardly and rearwardly as the three-point hitch is raised, the distance between the drawbar and the attachment point on the frame is reduced as the frame raises and the lower chain section becomes slack. The upper portion of the chain, which serves as a linkage between the drawbar and the forward end of the arm 38, is under tension and causes the forward end of the subframe to swing downwardly relative to the main frame as the main frame raises. Consequently, the rear transverse portion 40 of the subframe swings upwardly relative to the main frame as the main frame raises, multiplying or exaggerating the movement of the main frame. A pair of stops 46 respectively extend inwardly from the opposite legs 27 and 28 of the main frame and serve to limit the downward movement of the rearward portion of the subframe relative to the main frame, a small amount of slack being provided in said upper portion of the chain when the mower is in operating position.

A fore-and-aft pivot 48 is removably attached to the transverse beam 30 at alternate locations on the transverse beam, the forward end of the ivot extending through alternate holes 49 in the beam. A yoke 50 is rotatably mounted on the pivot 48, and a pivoting member 52 is rockable about a generally vertical pivot between the opposite arms of the yoke 50. The fore-and-aft axis of the pivot 48 and the vertical swinging axis of the pivoting member 52 provide a universal-type pivoting connection between the main frame and a laterally extending support structure, indicated generally by the numeral 54. The support structure includes a laterally extending, tubular drag bar 56, having its inner end connected to the pivoting member 52 by means of an adjusting mechanism 57, which permits axial adjustment of the drag bar 56 relative to the pivoting member 52. In the illustrated embodiment, the adjusting mechanism includes a socket in which the drag bar is keyed and is axially slidable, the drag bar being shifted by turning a cap screw attached to the drag bar in a threaded block attached to the socket. The support structure also includes a generally horizontal bifurcated member or yoke 58 having front and rear laterally extending arms 59 and 60 respectively and a generally flat central portion 62, which is provided with a transverse bore in which the end of the drag bar is rotatably received. The drag bar extends through the bore in the central portion 62 and a radial arm 64 is secured to the end of the drag bar adjacent to the yoke 62. An adjusting screw 66 has its lower end rotatably received in a socket 67 on the central portion of the yoke and extends through a threaded pivot 68 carried by the upper end of the arm 64. As is apparent, the above provides an adjusting mechanism for adjusting the angular position of the yoke relative to the drag bar, rotation of the adjusting screw 66 changing the distance between the yoke and the end of the arm 64 to rock the yoke about the end of the drag bar.

A mower driving head, indicated generally by the numeral 70, is swingably supported between the opposite arms 59 and 60 of the yoke 58 for rotation about a generally fore-and-aft axis. The driving head is of the type that converts rotary to reciprocating movement, such driving heads being utilized on many commercially available mowers. The driving head has a housing 72 and a fore-and-aft input shaft 74 which is rotatably received in and extends rearwardly through the rear arm 60 of the yoke 58. A pivot 75 coaxial with the input shaft 74 extends forwardly from the housing 72 and is rotatably received in the front yoke arm 59, so that the driving head rocks about the input shaft 74 and the pivot 75.

A cutter bar 76 of known construction is attached to the underside of the housing 72 and extends laterally outwardly from the driving head, which has a generally forwardly extending reciprocating arm 78 attached to the knife of the cutter bar 76. As is conventional, the cutter bar has an inner shoe 80 and an outer shoe 82, which are respectively mounted on the cutter bar at the inner and outer ends thereof and ride along the ground to support the weight of the mower not supported by the tractor.

The driving head 70 is driven by a drive system from the tractor PTO shaft 22, the drive system including a conventional drive shaft 84 provided with a pair of universal joints adjacent its front and rear ends, the forward end being connectible to the PTO shaft and the rearward ends being connected to a fore-and-aft drive shaft rotatably supported on the upper arm of the yoke 50. A drive sheave 88 is mounted on the end of the rearward drive shaft 86 and drives a driven sheave 90 mounted on the driving head input shaft 74 through a drive belt 91. A flywheel 92 is provided on the input shaft rearwardly of the driven sheave, which is shielded by a shield 93, the drive sheave 88 being similarly shielded by a shield 94. The tension in the belt 91 can be adjusted by axially shifting the drag bar 56 relative to the member 52 by means of the adjusting mechanism 57, as previously described.

A pull bar 96 is attachable to alternate attaching brackets 97 and 98 on the central portion 62 of the yoke 58, the forward end of the pull bar being connected to the main frame 24 by means of a member 99 extending laterally from the forward end of the right side C-shaped frame member 31. Since the support structure 54 is free to swing rearwardly about the axis of the pivot member 52, the pull bar is under tension as the tractor and mower advances. A release mechanism 100, of well known construction, is provided in the pull bar to allow the pull bar to separate when the tension in the pull bar exceeds a predetermined amount as the result of the cutter bar striking an obstruction. As is well known, the release mechanism is adjustable to vary the force which it takes to separate the pull bar, and the pull bar includes telescoping portions, which slide relative to one another when the release mechanism 100 releases, the pull bar in the illustrated embodiment allowing approximately 55° breakaway of the cutter bar from the operating position illustrated. Since the supporting structure pivots about the axis of the pivot member 52 during a breakaway, and the drive sheave 88 does not change positions during the breakaway and is located rearwardly of the axis of the member 52, the distance between the drive and driven sheaves decreases during a breakaway of the center bar to automatically disengage the drive when the cutter bar strikes an obstruction and breaks away. The alternate attaching brackets 97 and 98 are provided so that the same pull bar can be utilized when the mower is positioned in either its wide or narrow position, the forward bracket 97 being utilized when the mower is positioned for wide tread operation as illustrated in FIGS. 3 and 8.

A chain 102 has one end attached to the transverse or rearward portion 40 of the subframe 36 by means of a fastener 104 and its opposite end attached to one end of an arcuate link 106. The other end of the arcuate link 106 is pivotally connected to the driving head and is disposed between a pair of upright brackets 108 on top of the housing 72, the brackets 108 being provided with alternate pivot holes to permit the pivotal connection of the lower end of the link 106 at alternate locations. A helical tension spring 112 has its opposite ends connected to links in the chain 102 proximate to the opposite ends of the chain. The chain extends through the center of the spring, and the distance between the attaching points on the chain is greater than the static length of the spring, so that when the spring is unstretched, there is considerable slack in the chain. As is apparent, the chain limits the extension of the spring, which can be adjusted by shifting the spring to a different link in the chain.

A second chain 114 has one end attached to the transverse or rearward portion 40 of the subframe 36 by means of a fastener 116, which is adjacent to the fastener 104. The chain 114 is trained around a pulley 118 which is rotatably supported on the upper arm of the yoke 50 for rotation about a fore-and-aft axis generally below the attachment to the subframe. The other end of the chain 114 is attached to a lever arm 120 by means of an apertured link 122, the lower end of the arm 120 being pivotally connected to the driving head housing 72 on a fore-and-aft pivot 124 extending rearwardly from the rear bracket 108. The housing 72 is provided with a generally upright fore-and-aft abutment 126 adjacent to the inner side of the lower end of the lever arm 120, so that the lever arm 120 is free to rock in a clockwise direction (when viewed from the rear of the machine), but engages the abutment when it is rocked in a counterclockwise direction. As is apparent, rotation of the lever arm in the counterclockwise direction causes the driving head to rotate in the same direction about the fore-and-aft driving head pivot. The length of the chain 114 is such that there is a predetermined amount of slack in the chain when the main frame is in its lowered operating position and the cutter bar is in a generally horizontal position, and a tension spring 127 has its opposite ends connected to the chain on opposite sides of the pulley 118 to take up the slack in the chain.

The central portion 62 of the yoke 58 has an upright post 128 which projects through the apertured link 122 when the cutter bar is rotated to its transport position, as shown in FIG. 4, and a fore-and-aft lock pin 130 is insertable through the upper end of the post 128 above the link 122 when the cutter bar is in the transport position to lock the lever arm 120 and its associated link 122 to the yoke 58, thereby locking the driving head and consequently the cutter bar in the transport position.

In operation, the mower is initially set in either its wide or narrow position depending on the width of the tread of the tractor on which the mower is mounted. The cutter bar is shown in its wide position in all the drawings except FIG. 4, wherein it is illustrated in its narrow position, which, in the illustrated embodiment, is 9 inches inwardly of the wide position. Thus, the pivot 48 is located 4½ inches to the right of the tractor centerline in the wide position of the mower and 4½ inches to the left of the centerline in the narrow position. Similarly, the transverse portion 40 of the subframe is attached to the rearward ends of the subframe arms 38 and 39 4½ inches to the right of the centerline in the wide position and 4½ inches to the left of the centerline in the narrow position. To convert from the wide to the narrow position, it is merely necessary to shift the location at which the pivot 48 is clamped to the main frame beam 30, the pivot 48 extending through the alternate holes 49 in its alternate positions. The transverse portion 40 is then removed from the arms 38 and 39, the arms are then reversed, and the transverse portion 40 is again bolted to the rearward ends of the arms 38 and 39. The 4½ inch offset of the point between the two attaching bolts from the tractor centerline shifts the transverse portion 9 inches laterally and consequently shifts the point of attachment of the chain 102 and the chain 114 9 inches laterally. The pull bar 96 is also shifted from the attaching bracket 97 to the attaching bracket 98 on the yoke 58 when the mower is adjusted from the wide to the narrow position.

Figure 5:
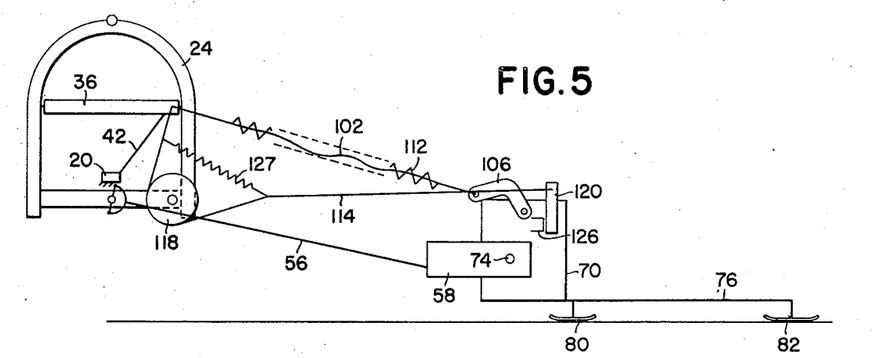
FIG. 5 is a schematic rear elevation view of the mower in operating position.
Figure 7:
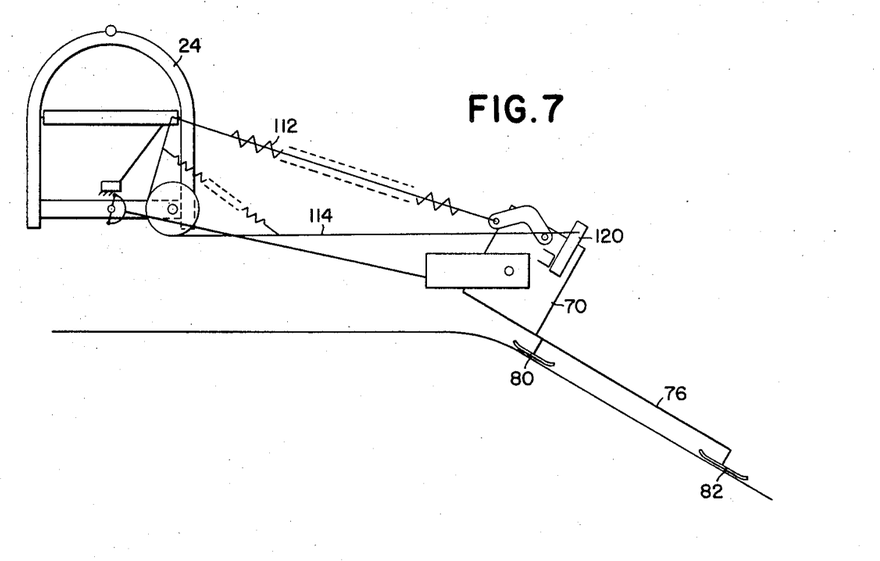
FIG. 7 is a schematic view similar to FIG. 5 but with the outer end of the cutter bar angled downwardly to a maximum down float position of the mower.
Figure 9:
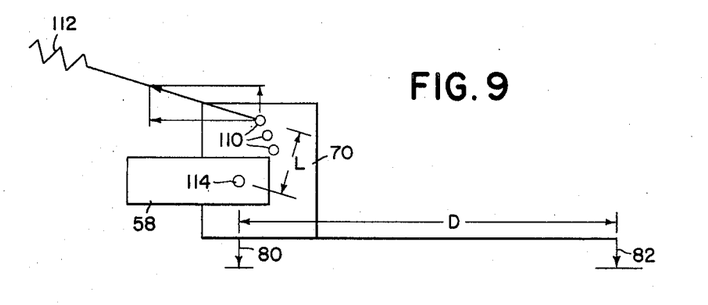
FIG. 9 is a schematic rear view illustrating the forces exerted by the counterbalance spring and the weight of the mower.

When the mower is in operating position, as shown in FIG. 5, there is slack in both the chain 114 and the chain 102, although the spring 112 is partially stretched. The spring 112 exerts a counterbalancing force which is applied to both the inner shoe 80 and the outer shoe 82. As shown in FIG. 9, the weight supported on the outer shoe exerts a moment about the pivot of the driving head equal to the weight of the outer shoe times the distance D from the driving head pivot, which moment is counteracted by the moment created by the force exerted by the spring times the distance L that the spring is offset from the driving head pivot. The weight on the inner shoe 80 is counterbalanced by the vertical component of the force exerted by the spring 112. The amount of counterbalancing force for the outer shoe can be varied by changing the length of the lever arm through which the spring force acts by utilizing the alternate mounting holes 110 for the link 106. For example, if a shorter, lighter weight cutter bar is utilized, the bottom mounting hole is utilized, while if a longer heavier cutter bar is utilized, the top mounting hole is used to provide a maximum lever arm L. The length of the lever arm and the spring 112 are initially chosen so that the spring will simultaneously counterbalance a substantial portion of the weight in both the inner and outer shoes. Preferably, the inner shoe weight is somewhat greater than the weight on the outer shoe, the inner shoe weight preferably being approximately 80 lbs., while the weight on the outer shoes is approximately 35 lbs. Such weights will allow the cutter bar to closely follow the contour of the ground, while permitting it to float upwardly when it strikes a mound or other obstruction. Of course, the extension of the spring 112, when the cutter bar is in its operating position, depends on the particular links in the chain 102 to which the opposite ends of the spring are attached, and the links are selected to provide a vertical component of the spring force that counterbalances all but approximately 80 lbs. of the weight on the inner shoe. After the inner shoe weight is established, the outer shoe weight can be adjusted by mounting the link in the alternate pivot holes as previously described.

when the mower is in its normal operating position, as shown in FIG. 5, the length of the chain 114 is selected so that there is substantial slack in the chain. The slack permits the driving head and the cutter bar attached thereto to swing downwardly to follow the contour of the ground. The outer shoe 82 will float downwardly until the chain 114 becomes taut, as shown in FIG. 7, wherein the mower is shown in its maximum down float position. Preferably, sufficient slack is provided in the chain 114 to allow approximately 30° down float. The link 106 is arcuate so that it will clear the housing 72 as the cutter bar floats downwardly.

Figure 1:
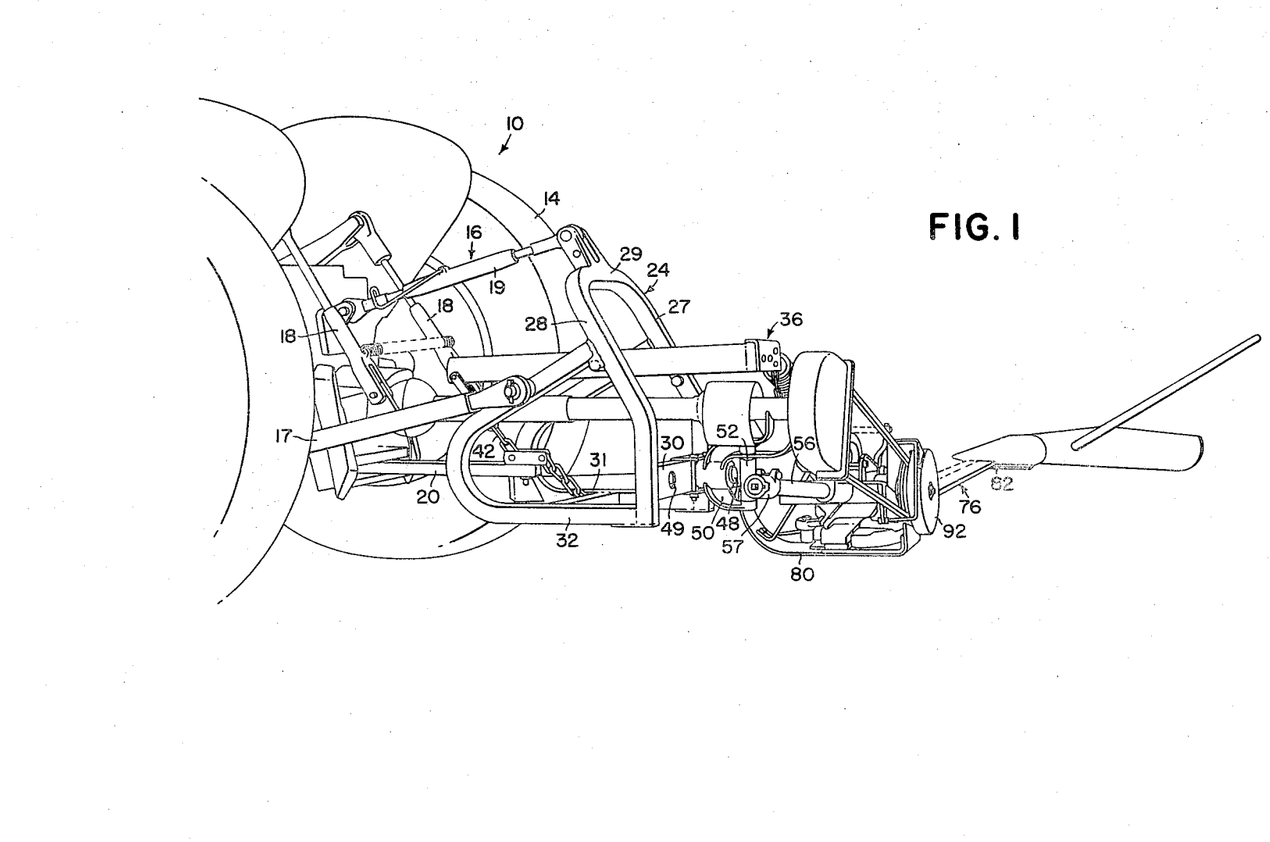
FIG. 1 is a left rear perspective of the mower and the rear end of the tractor on which it is mounted with the mower in operating position.
Figure 2:
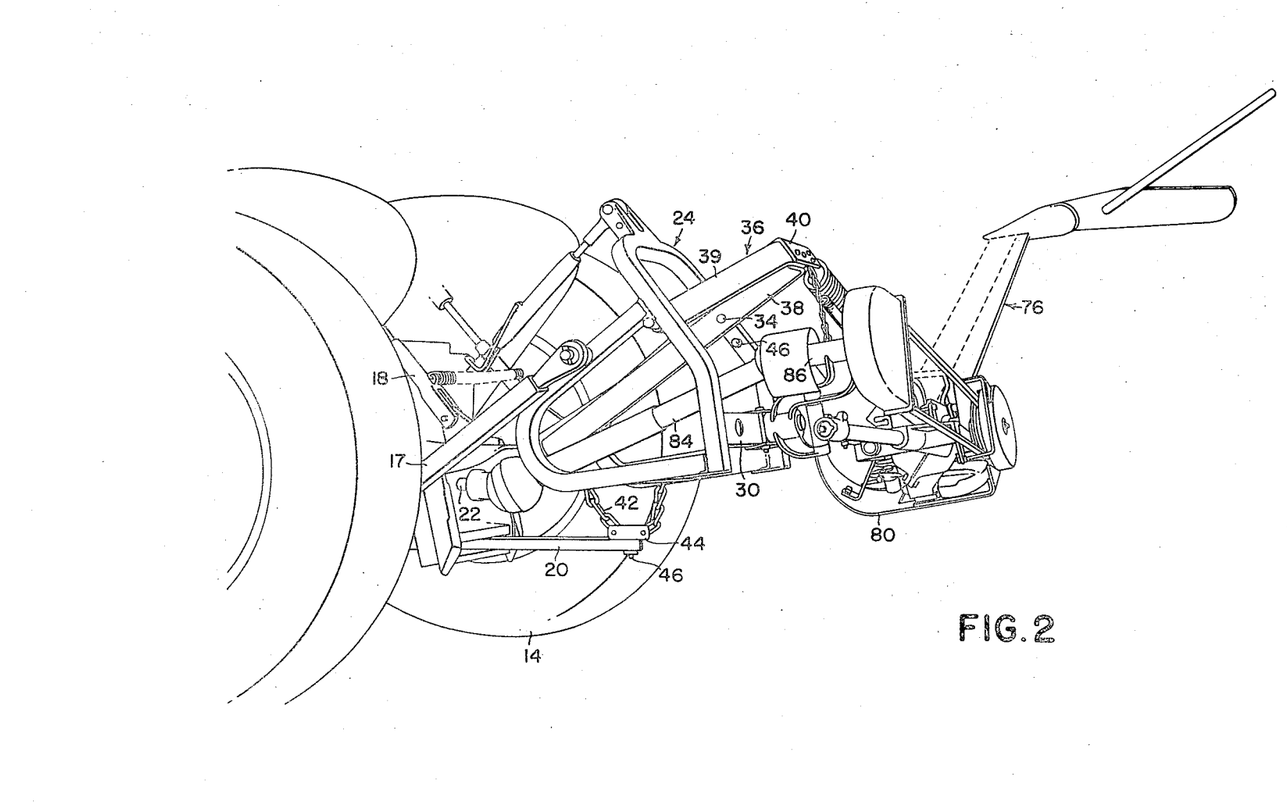
FIG. 2 is a very similar to FIG. 1 but with the mower in the raised position.
Figure 6:
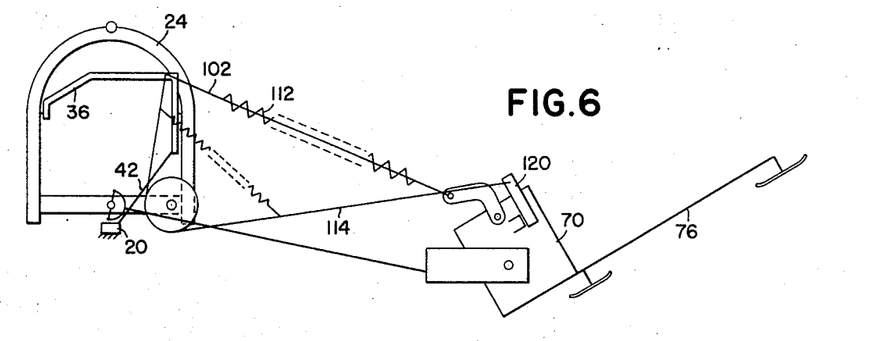
FIG. 6 is a view similar to FIG. 5 but with the mower in a raised position.

To raise the mower, the three-point hitch is raised, raising the main rame 24. Since the forward end of the subframe 36 is held by the chain 42, the subframe swings relative to the main frame with the rearward end of the subframe raising at a more rapid rate than the main frame. The relative movement between the subframe and the main frame pulls on the chain 114, the initial portion of the movement taking up the slack in the chain 114, and after the chain is taut, the chain pulls on the lever 120, which engages the abutment 126 to swing the driving head 70 and the cutter bar 76 upwardly about the driving head pivot. Since the drag bar 56 is pivotally connected to the main frame, the inner shoe remains on the ground. However, as the rearward end of the subframe 36 raises, the float spring 112 elongates, reducing the weight on both the inner and the outer shoe. When the lift chain 114 tightens to start the raising of the outer shoe 82, additional weight is transferred to the inner shoe 80, and the float spring 112 continues to elongate until the slack in the chain 102 is removed. At this time, additional raising of the rearward end of the subframe, raises the inner shoe while the outer shoe is also being raised, the mower being shown in the raised position in FIG. 6 and FIG. 2. After the mower is placed in the raised position, it can be manually folded over to the transport position shown in FIG. 4.

To again place the mower in operation position, the main frame is lowered until the chain connection between the drawbar 20 and the main frame becomes taut, thereby establishing the lowermost or operating position of the mower.

To adjust the tilt of the cutter bar about a horizontal, transverse axis, the adjusting screw 66 is rotated to rock the yoke 58 and consequently the cutter bar about the transverse axis of the drag bar as previously described.

When the cutter bar breaks away, as previously described, raising the hitch causes the spring 112 to stretch and exert a forward pull on the driving head, which swings the support structure forwardly to its normal position, the release mechanism 100 automatically relatching when the support structure reaches its normal position, so that the operator can restore the mower to its operating condition without leaving the tractor.

We claim:

1. A mower attachable to a tractor having a vertically adjustable hitch and comprising: a vertically adjustable main frame mounted on the tractor hitch; a transverse pivot means on the main mower frame; a subframe swingably mounted on said pivot means; a first linkage means connecting the subframe to the tractor forwardly of the pivot means to cause the subframe to swing relative to the main frame as the main frame raises; a transversely extending support structure having one end pivotally connected to the main frame and having a generally fore-and-aft pivot means adjacent its outer end; a mower driving head pivotally mounted on said fore-and-aft pivot means; a cutter bar connected to and extending laterally outwardly from the driving head and operatively driven thereby; a spring means operatively connected to one of said frames and to the driving head for partly counterbalancing the weight of the driving head and cutter bar; and a second linkage means operatively connected to the driving head at a point offset from said fore-and-aft pivot means and to the subframe rearwardly of the transverse pivot means so that the driving head is rocked about said fore-and-aft pivot means at least during a portion of the rocking movement of the subframe relative to the main frame to raise the outer end of the cutter bar.

2. The invention defined in claim 1 wherein the main frame includes a generally U-shaped member having generally upright legs, the transverse pivot means being mounted on the legs, and the subframe includes a pair of arms respectively pivotally connected to the legs and a rearward portion interconnecting the arms rearwardly of the pivot means, the first linkage means being connected to one of said arms forwardly of the pivot means.

3. The invention defined in claim 2 wherein the second linkage means is connected to the rearward portion offset from the fore-and-aft centerline between the legs of the main frame member, the subframe arms being removably connected to the main frame member and reversible so that the second linkage means is connected to the subframe in alternate positions when the arms are reversed.

4. The invention defined in claim 1 wherein the tractor has a rearwardly extending drawbar, and the first linkage means includes a chain connecting the subframe to the drawbar.

5. The invention defined in claim 4 and including a second chain connecting the main frame to the drawbar to limit the downward movement of the main frame and thereby establish the lowermost position of the main frame.

6. The invention defined in claim 1 wherein the support structure includes a transversely extending drag bar having its inner end pivotally connected to the main frame, a yoke having means defining said fore-and-aft pivot means, and tilt adjusting means connecting the yoke to the outer end of the drag bar for selective adjustment of the yoke about a generally transverse axis to vary the attitude of the fore-and-aft pivot means about said axis and thereby adjust the tilt of the cutter bar.

7. The invention defined in claim 1 wherein the support structure is pivotally connected to the main frame at alternate transversely spaced locations to vary the lateral position of the cutter bar relative to the tractor, and the subframe arms are reversible on said transverse pivot means so that the second linkage means and the spring means are selectively connected to the subframe at alternate locations to accommodate the alternate positions of the support structure.

8. The invention defined in claim 1 wherein the tractor includes a PTO drive shaft, and the driving head is driven by a drive system including a drive sheave selectively journaled on the main frame at alternate locations corresponding to the alternate location of the support structure and connected to the PTO shaft by a drive shaft, a driven sheave mounted on the driving head and serving as an input thereto, and a belt drivingly connecting the drive sheave to the driven sheave.

9. The invention defined in claim 1 wherein the spring means is a tension spring operatively connected to the driving head at a point offset from the fore-and-aft pivot means so that the force exerted thereby tends to rotate the driving head in the opposite direction from the weight of the cutter bar to partly counterbalance the weight supported at the outer end of the cutter bar, the spring also exerting a force tending to rotate the supporting structure upwardly about its pivot connection to the main frame to partly counterbalance the weight supported on the inner end of the cutter bar.

10. The invention defined in claim 9 wherein the spring means is attachable to the driving head at alternate locations to selectively vary the offset from the pivot means and thereby vary the counterbalance force at the outer end of the cutter bar.

11. The invention defined in claim 1 wherein the second linkage means includes a flexible element having a predetermined amount of slack when the cutter bar is supported in a level position and the main frame is in its lowered position, the pivoting movement of the subframe as the main frame raises initially taking up the slack and thereafter causing the driving head to rock about the fore-and-aft pivot means to raise the outer end of the cutter bar.

12. The invention defined in claim 11 wherein the second linkage means limits the rocking movement of the driving head and thereby limits the downward movement of the outer end of the cutter bar, the predetermined slack in the linkage means allowing a predetermined amount of downward movement of the outer end of the cutter bar relative to the inner end.

13. The invention defined in claim 1 wherein the cutter bar is swingable upwardly from a horizontal operating position past a vertical position to an inclined folded position and including a locking means mounted on the support structure and operatively connectible to the second linkage means to lock the driving head to the support structure with the cutter bar in its folded position.

14. A mower attachable to a tractor having a vertically adjustable hitch and comprising: a vertically adjustable main frame mounted on the tractor hitch and including a generally U-shaped member having generally upright legs; a pair of coaxial transverse pivot means respectively mounted on the opposite legs; a subframe including a pair of arms respectively mounted on the pivot means and a rearward portion interconnecting the arms rearwardly of the pivot means; a first linkage means connecting at least one of said arms forwardly of the pivot means to the tractor, to cause the rearward portion of the subframe to swing upwardly about said pivot means as the main frame raises; a transversely extending support structure having one end pivotally connected to the main frame and carrying a generally fore-and-aft pivot means adjacent its outer end; a mower driving head swingably mounted on said fore-and-aft pivot means; and a cutter bar connected to and extending laterally from the driving head and swingable therewith from a generally horizontal operating position to an upwardly and outwardly inclined raised position; and a second linkage means operatively connecting the driving head to the subframe rearwardly of the transverse pivot means so that the driving head rocks about said fore-and-aft pivot means during at least a portion of the upwardly swinging movement of the rearward portion of the subframe to raise the cutter bar from its horizontal position to its raised position.

15. The invention defined in claim 14 wherein the second linkage means is connected to the rearward portion of the subframe offset from the fore-and-aft centerline of the tractor and the subframe arms are reversible so that the point of connection between the subframe and the second linkage means is located in alternate positions when the arms are reversed.

16. The invention defined in claim 14 wherein the tractor includes a rearwardly extending drawbar and the first linkage means includes a chain interconnecting one of said arms to the drawbar.

17. The invention defined in claim 16 and including a chain operative between the drawbar and the main frame to limit the downward movement of the main frame.

18. A mower attachable to a tractor having a vertically adjustable hitch and a rearwardly extending drawbar, said mower comprising: a vertically adjustable main frame mounted on the tractor hitch; a pivot means on the main frame; a subframe swingably mounted on said pivot means; a first linkage means connecting the subframe to the tractor to cause the subframe to pivot relative to the main frame as the main frame raises; a flexible linkage between the drawbar and the main frame for limiting the downward movement of the main frame to establish the lowermost operating position of the mower; a transversely extending support structure having one end pivotally connected to the main frame and having a generally fore-and-aft pivot means adjacent to its outer end; a mower driving head pivotally mounted on said fore-and-aft pivot means; a cutter bar connected to and extending laterally outwardly from the driving head and operatively driven thereby; and a second linkage means operatively connecting the driving head to the subframe so that the driving head rocks about said fore-and-aft pivot means at least during a portion of the rocking movement of the subframe relative to the main frame to raise the outer end of the cutter bar during at least a portion of the raising of the main frame.

19. The invention defined in claim 18 wherein said first linkage means and said flexible linkage means comprise a chain having one end connected to the main frame, the other end connected to the subframe, and connected to the drawbar intermediate its opposite ends.

20. A mower comprising: a frame means; a transversely extending support structure having one end pivotally connected to the frame means and having a generally fore-and-aft pivot means adjacent to its outer end; a mower driving head pivotally mounted on said fore-and-aft pivot means; a cutter bar connected to and extending laterally outwardly from the driving head and operatively driven thereby and swingable with the driving head about said fore-and-aft pivot means from a generally horizontal operating position, to an upwardly and outwardly inclined raised position, and thereafter to an upwardly and inwardly inclined folded transport position; a linkage means operatively connecting the driving head to the frame means for rocking the driving head and the cutter bar from said operating position to said raised position as the frame means raises; and locking means operative to lock the linkage means to the support structure when the driving head and cutter bar are rotated to said transport position.

21. The invention defined in claim 20 wherein the linkage means includes an apertured element, and the locking means includes a generally upright member, extending upwardly from the supporting structure and extendible through the apertured element when the cutter bar is shifted to its transport position, and pin means extendible through the upright member above the apertured element to lock the apertured element on the upright member.

22. A mower attachable to a tractor having a vertically adjustable hitch and a rearwardly extending power take-off shaft, said mower comprising: a vertically adjustable main frame mounted on the tractor hitch and including a generally U-shaped member having generally upright legs; a pair of transversely aligned pivots mounted on the opposite legs; a subframe swingably mounted on said pivots and including a pair of arms respectively mounted on the respective pivots and a rearward portion interconnecting the arms rearwardly of the pivot means; a first linkage means connecting one of said arms to the tractor forwardly of the pivot means to cause the rearward portion of the subframe to raise relative to the main frame as the main frame raises; a transversely extending support structure having one end pivotally connectible to the main frame at alternate locations on opposite sides of the tractor centerline and having a generally fore-and-aft pivot means adjacent its outer end; a mower driving head pivotally mounted on said fore-and-aft pivot means; a cutter bar connected to and extending laterally outwardly from the driving head and operatively driven thereby; a drive system connecting the power take-off shaft to the driving head and including a drive sheave rotatably supported on the main frame for lateral adjustment between alternate positions on opposite sides of the centerline and connected to the power take-off shaft by a drive shaft, a driven sheave drivingly connected to the driving head coaxial with the fore-and-aft pivot means, and a belt drive interconnecting the drive and driven sheaves; and a second linkage means operatively connecting the driving head to the rearward portion of the subframe, at least a portion of the subframe being reversible so that the second linkage means is connected to the subframe at alternate locations corresponding to the alternate locations of the support structure.

23. The invention defined in claim 22 and including a spring means connected to the driving head and the rearward portion of the subframe substantially the same location as the second linkage means.

24. A mower comprising: a vertically adjustable main frame, a subframe swingably mounted on the main frame and operatively connected to the main frame for vertical adjustment therewith and rocking movement relative thereto as the main frame raises; a transversely extending support structure having one end pivotally connected to the main frame and having a generally fore-and-aft pivot means adjacent its outer end; a mower driving head pivotally mounted on said fore-and-aft pivot means; a cutter bar connected to and extending laterally outwardly from the driving head and operatively driven thereby; a tension spring means operatively connected to a portion of the subframe that raises at a more rapid rate than the main frame during the raising of the main frame; means connecting the spring means to the driving head at a point offset from the fore-and-aft pivot means so that the force exerted by the spring means tends to rotate the driving head in the opposite direction from the weight of the cutter bar to partly counterbalance the weight supported at the outer end of the cutter bar, the spring means also exerting a force tending to rotate the supporting structure upwardly about its pivot connection to the main frame to partly counterbalance the weight supported on the inner end of the cutter bar; and linkage means operatively connecting the driving head to the subframe so that the driving head is rocked about said fore-and-aft pivot means to raise the outer end of the cutter bar at least during a portion of the rocking movement of the subframe relative to the main frame.

25. The invention defined in claim 24 wherein the means connecting the spring to the driving head includes a chain connected in parallel with the spring means to limit the extension of the spring means to a predetermined amount, the chain transmitting the vertical movement of the subframe directly to the driving head after said predetermined amount of spring extension to raise the driving head about the pivot connection between the support structure and main frame.

26. A mower attachable to a tractor having a vertically adjustable hitch and comprising: a vertically adjustable main frame mounted on the tractor hitch; a subframe swingably mounted on the main frame; a first linkage means connecting the subframe to the tractor to cause the subframe to pivot relative to the main frame as the main frame raises so that a portion of the subframe raises at a faster rate than the main frame; a transversely extending support structure having one end pivotally connected to the main frame and having a generally fore-and-aft pivot means adjacent its outer ends; a mower driving head pivotally mounted on said fore-and-aft pivot means; a cutter bar connected to and extending laterally outwardly from the driving head and operatively driven thereby; a spring means operatively connected to one of said frames and to the driving head for partly counterbalancing the weight of the driving head and the cutter bar; and a flexible element operatively connected to the driving head at a point offset from the fore-and-aft pivot means and to said portion of the subframe to cause the cutter bar to raise about said fore-and-aft pivot means during the latter portion of the raising motion of the main frame, the flexible element being provided with a predetermined amount of slack when the cutter bar is in a generally horizontal operating position, which slack is taken up during the initial raising movement of the main frame and permits a predetermined amount of downward movement of the outer end of the cutter bar so that the cutter bar follows the contour of the ground.

27. The invention defined in claim 26 wherein the flexible element is connected to the driving head through a lever swingably connected to the driving head about a generally fore-and-aft axis and engageable with an abutment on the driving head to transmit the lifting force exerted by the flexible element.

28. The invention defined in claim 27 and including a pulley mounted on the subframe, the flexible element being trained around said pulley so that the vertical movement of the subframe portion results in a generally horizontal force, which is exerted on the driving head through the flexible element, the lever, and the driving head abutment.

* * * * *